Oct. 6, 1936.  J. S. PECKER  2,056,886
CENTRIFUGAL SEPARATING MACHINE AND METHOD
OF TREATING SEWAGE AND OTHER SLUDGES
Filed Feb. 28, 1934  6 Sheets-Sheet 1

Joseph S. Pecker,
INVENTOR
By
ATTORNEY

Joseph S. Pecker,
INVENTOR

ATTORNEY

Oct. 6, 1936.                    J. S. PECKER                    2,056,886
           CENTRIFUGAL SEPARATING MACHINE AND METHOD
              OF TREATING SEWAGE AND OTHER SLUDGES
                  Filed Feb. 28, 1934        6 Sheets-Sheet 5
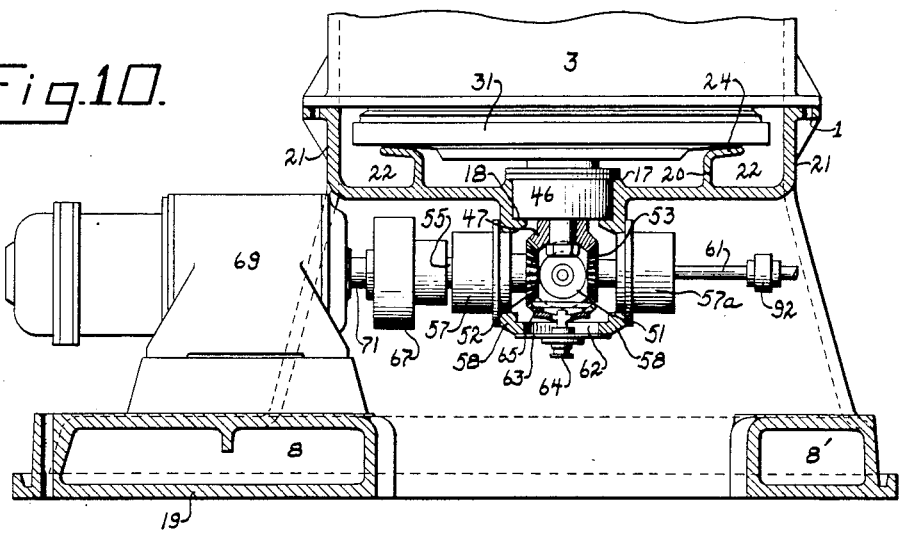
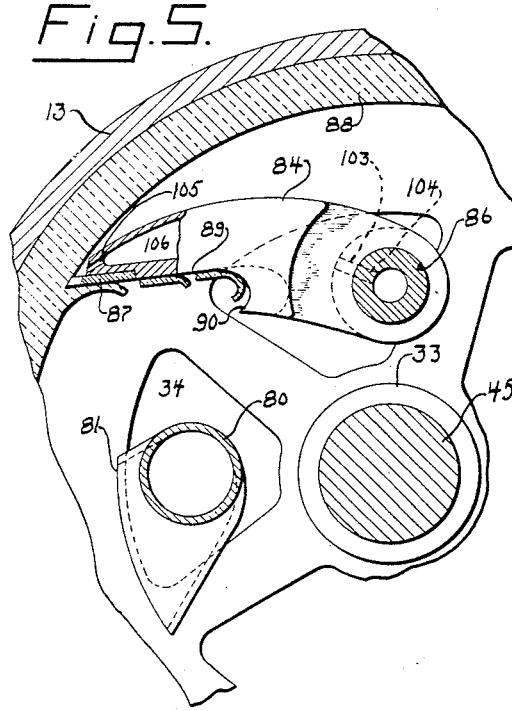
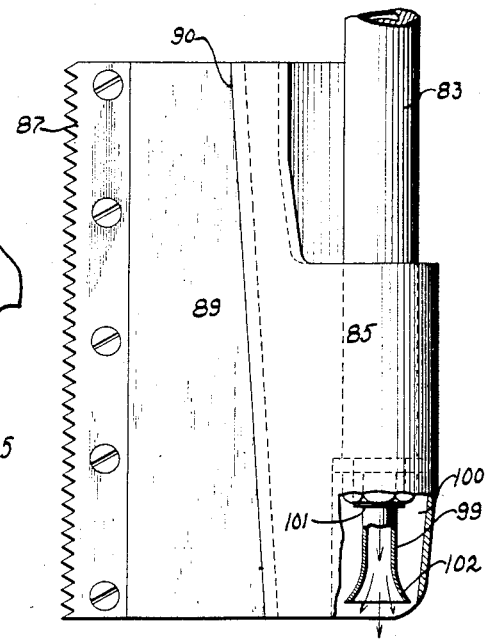
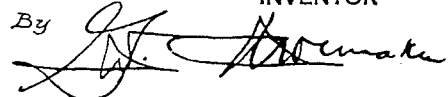
Joseph S. Pecker,
INVENTOR
ATTORNEY Oct. 6, 1936.  J. S. PECKER  2,056,886
CENTRIFUGAL SEPARATING MACHINE AND METHOD
OF TREATING SEWAGE AND OTHER SLUDGES
Filed Feb. 28, 1934   6 Sheets-Sheet 6
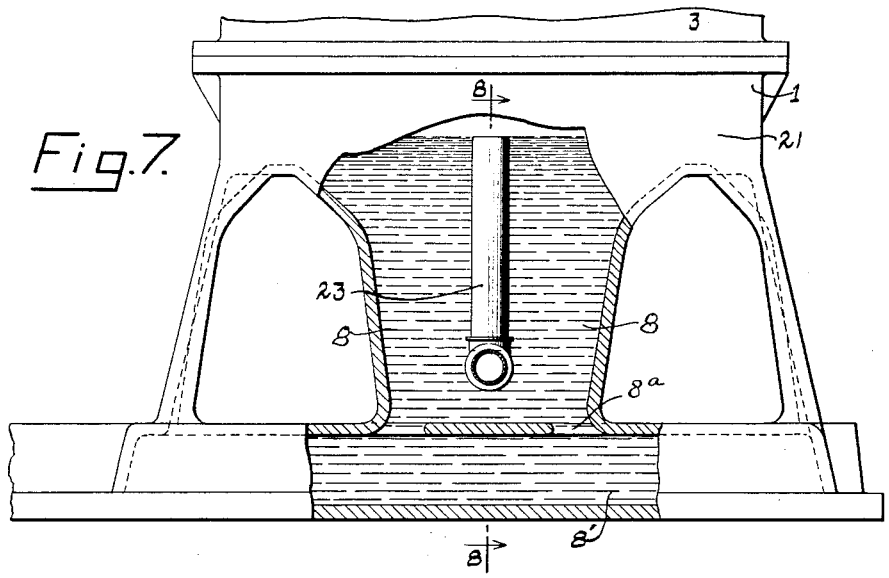
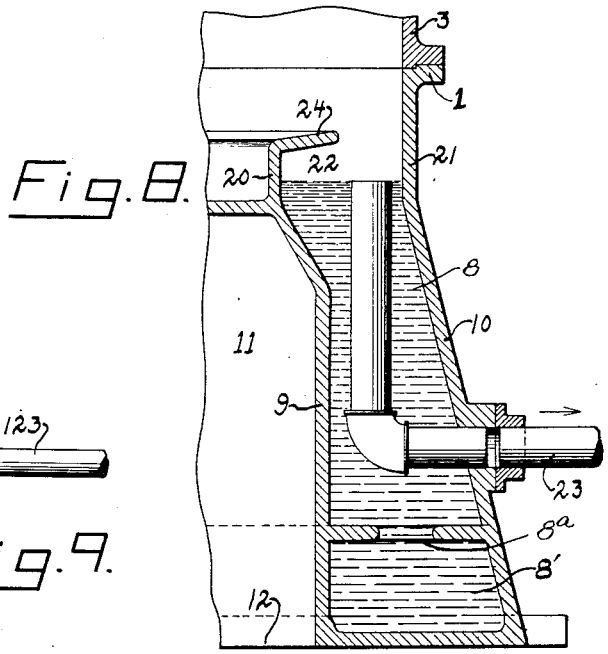
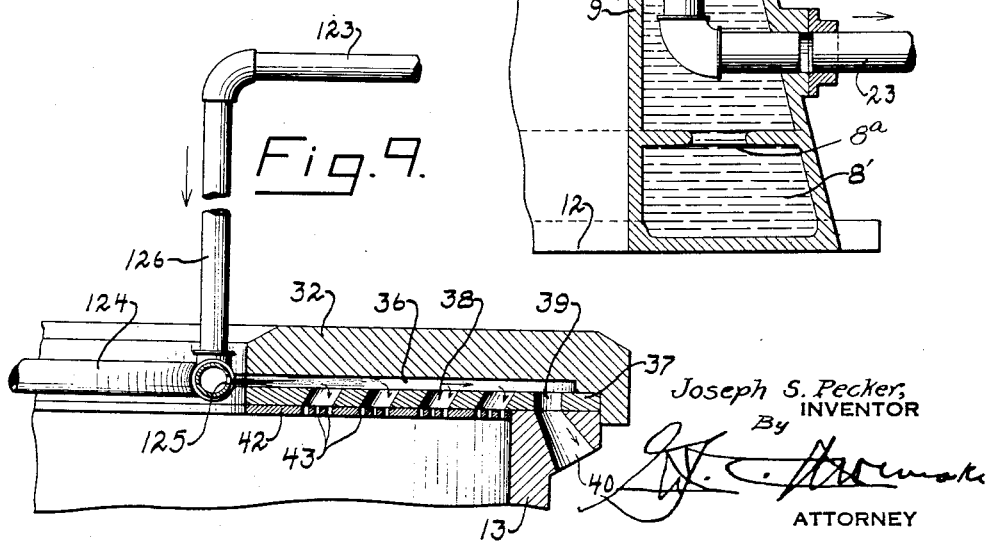
Joseph S. Pecker, INVENTOR Patented Oct. 6, 1936

2,056,886

UNITED STATES PATENT OFFICE 2,056,886

CENTRIFUGAL SEPARATING MACHINE AND METHOD OF TREATING SEWAGE AND OTHER SLUDGES

Joseph S. Pecker, Philadelphia, Pa., assignor to American Centrifugal Corporation, New York, N. Y., a corporation of Delaware Application February 28, 1934, Serial No. 713,383

40 Claims. (Cl. 210—63)

The invention relates to a centrifugal machine for separating liquids from solids by centrifugal action and is a modification of the centrifugal machine shown, described and claimed in a copending application filed by me on or about the 21st day of February 1934, Serial No. 712,390.

The centrifugal machine is designed primarily for the separation of sludges in which there is material in suspended or colloidal solution with another liquid.

Green sewage coming from the mains is usually screened by vertical bars so that large pieces of wood, rag, stone, etc. are screened out. The sewage then flows through grid chambers where heavy particles of sand, stone, etc. will settle quickly and will be eliminated. The sewage then flows into settling tanks wherein the sludge in suspension settles to the bottom and the clarified water or effluent is conducted off. This sludge is called primary settled sludge.

The effluent from the primary tank then takes one of several courses depending on the character of the plant.

In what is known as a primary treatment plant, the effluent is permitted to flow back into rivers, streams, lakes, etc. Where this condition is not permitted by health authorities, the effluent is permitted to run into another settling tank where the effluent is agitated in the presence of injections of air which causes the coagulation of the fine particles held either in suspension or in colloidal state. The coagulated material is known as activated sludge. This material may be then permitted to flow into another tank termed as a final settling tank in which the coagulated material drops to the bottom of the tank, and the effluent from this settling tank is extremely clear water. The settled solids in this tank are also called activated or aerated sludge but of a more concentrated character than the sludge in an aerating tank.

The sludge collected from the primary tank, activating tank and final settling tank is fed to digestion tanks where the material through biological action decomposes. The effluent from the digestion tanks is reasonably clear and the residue is called digested sludge.

There are other systems known as chemical treatment plants in which the incoming sewage is treated chemically in order to eliminate the activation or aeration of the sludge as well as the digestion process.

It will thus be seen that there is primary or raw sludge, activated sludge, final settling tank sludge, digested sludge and chemically treated sludge. All of these sludges have a water content of approximately 85% to 98%. In order to facilitate the handling of this material and the final disposition of the sludge, it is essential that the material be dewatered to at least 70% moisture so that the material may be handled with a spade or shovel and utilized as fertilizer or burned in incinerators.

The consistency of the sludge is exceedingly irregular; there is no definite proportion of solid content, nor a definite percentage of organic or inorganic matter, grease, etc. upon which accurate separation may be based.

One object of the present invention is to provide a centrifugal separating machine adapted to handle raw, activated or digested sludge and equipped with a hollow base constituting a chemical tank and adapted to permit the effluent from the centrifugal separating machine to be subjected to currents of air and also to be treated with chemicals so that when the effluent is discharged from the machine it will be as clear and as unobjectionable as desired to meet all requirements or regulations as to disposal of such effluent in order that it may be discharged into rivers, streams, lakes, or otherwise disposed of without infringing any regulations concerning the contamination of streams or bodies of water.

A further object of the invention is to provide a centrifugal separating machine equipped with a rotary centrifugal basket adapted to be operated at high and low speeds for purging at high speed and for unloading purged material at low speed.

A further object of the invention resides in the provision of a rotary centrifugal basket for the centrifugal separation of liquids from solids and having imperforate side walls and with which basket is associated seepage means having communication with the interior of the basket and carried by the latter and rotatable therewith to effect discharge of the separated liquids from the basket and through which seepage means a fluid medium under pressure may be directed while the basket rotates.

A further object of the invention is to provide a centrifugal separating machine in which the tank for the reception of the effluent will be arranged to permit free mixing with the effluent in the tank of currents of air created by the windage or the revolving of the centrifugal basket to produce an oxidation effect on the effluent and precipitate coagulations.

Another object of the present invention is to provide a centrifugal separating machine in which is embodied a rotary centrifugal basket having imperforate side walls and provided at the top with seepage means and also having means for subjecting the seepage means to the action of a fluid medium under pressure for the purpose of cleaning the seepage means.

A further object of the invention is to provide a scraper for rotary centrifugal baskets operable to remove dewatered sludge from the walls of the basket in which the scraper is provided with a shoulder inclined with relation to the scraper and projecting laterally therefrom and which shoulder is concaved transversely to form a shoulder substantially semi-circular in cross section and which concaved face is disposed transversely with relation to the shoulder.

Another object of the invention goes to a method of dewatering sewage and other sludges in which, in a closed system, that is, a single equipment, the material to be dewatered is fed and centrifuged to separate the liquid from the solids and form a cake of the latter, subjecting the separated liquid to turbulence and aeration, collecting the aerated liquid and the solids in suspension therein, introducing a chemical agent into the separated liquid at the zone of turbulence and aeration to effect a thorough mixing of the liquid, air and chemical agent to effect rapid coagulation of the separated solids in suspension and a settling of the separated suspended solids by gravity, purifying the liquid and, if desired, reducing the cake of solids to small particles at the place where the cake is formed.

Another object of the invention is to provide a centrifugal separating machine in which the separation is effected by a rotary centrifugal basket having imperforate side walls and provided at the top with seepage means and also provided with means for cleaning the seepage means and also provided with means for removing particles remaining on the inner faces of the vertical walls of the basket by forcing such particles or accumulations back into the basket or out through the seepage passages to clean completely the machine at the end of each cycle of operation.

It is also an object of the invention to utilize compressed air or other fluid medium under pressure for forcing material cut from the walls of the basket down through an opening in the bottom of the basket and also through an opening below the basket to enable such material to be discharged into a pit or into an incinerator or on to a conveyor or for otherwise disposing of the cut material.

It is also an object of the invention to provide for supplying the machine with compressed air or other fluid medium under pressure for cleaning and material discharging purposes.

Another object of the invention is to equip the centrifugal separating machine with means operating within the rotary centrifugal basket for cutting the dewatered sludge from the walls of the basket and for curling or coiling the cut material away from the cutting means and simultaneously forcing the same downwardly through the bottom of the basket as the fluid medium under pressure removes the cut material from the basket to unload the latter.

With these and other objects in view, the invention consists in the method and construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Fig. 5 is an enlarged detail horizontal sectional view illustrating the construction of the scrapers and the arrangement of the outlets of the sludge feeding means.

Fig. 6 is an enlarged side view of one of the scrapers, a portion thereof being broken away to illustrate the construction of the air discharge nozzle.

Fig. 7 is an enlarged detail elevation of a portion of the hollow base partly broken away to show the chemical tank.

Fig. 8 is a vertical sectional view of the same on the line 8—8 of Fig. 7.

Fig. 9 is an enlarged detail sectional view illustrating the arrangement of the cleaner ring with relation to the radial channels and seepage openings.

Fig. 10 is a vertical sectional view through the lower portion of the machine taken at right angles to Fig. 2.

Figure 1:
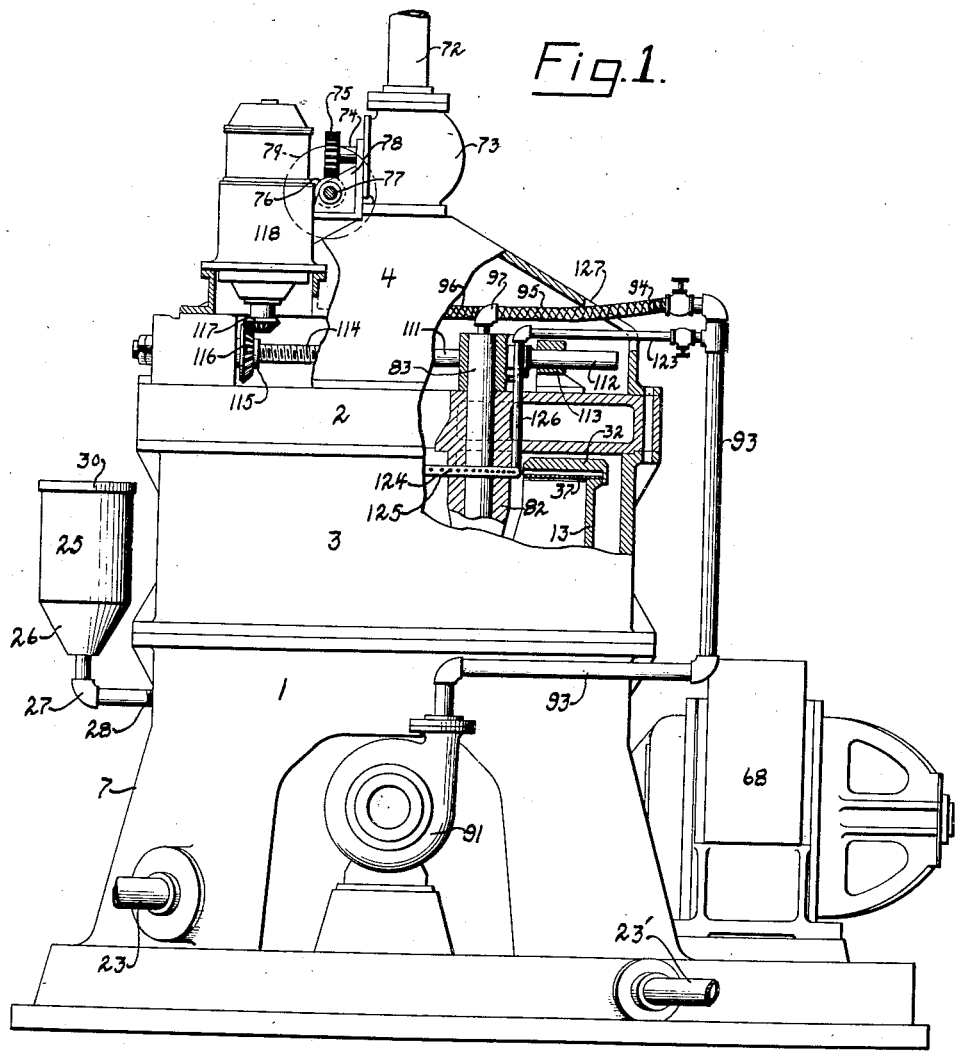
Figure 1 is a side elevation of a centrifugal separating machine constructed in accordance with this invention, parts being in sections.

In the accompanying drawings in which is illustrated one embodiment of the invention the centrifugal separating machine comprises in its construction a casing embodying the essential characteristics of the casing shown and described in the aforesaid application and composed of a lower section 1, upper and lower intermediate sections 2 and 3, and a top section 4 secured together by upper and lower vertical bolts 5 and 6, the upper bolts being elongated and extending through the upper intermediate section 2 and securing the top section 4 and the upper and lower intermediate sections together and adapted to be removed to permit the removal of the top section, the upper intermediate section, a feeding unit and a basket unit as hereinafter described and as fully shown and described in the aforesaid application.

Figure 3:
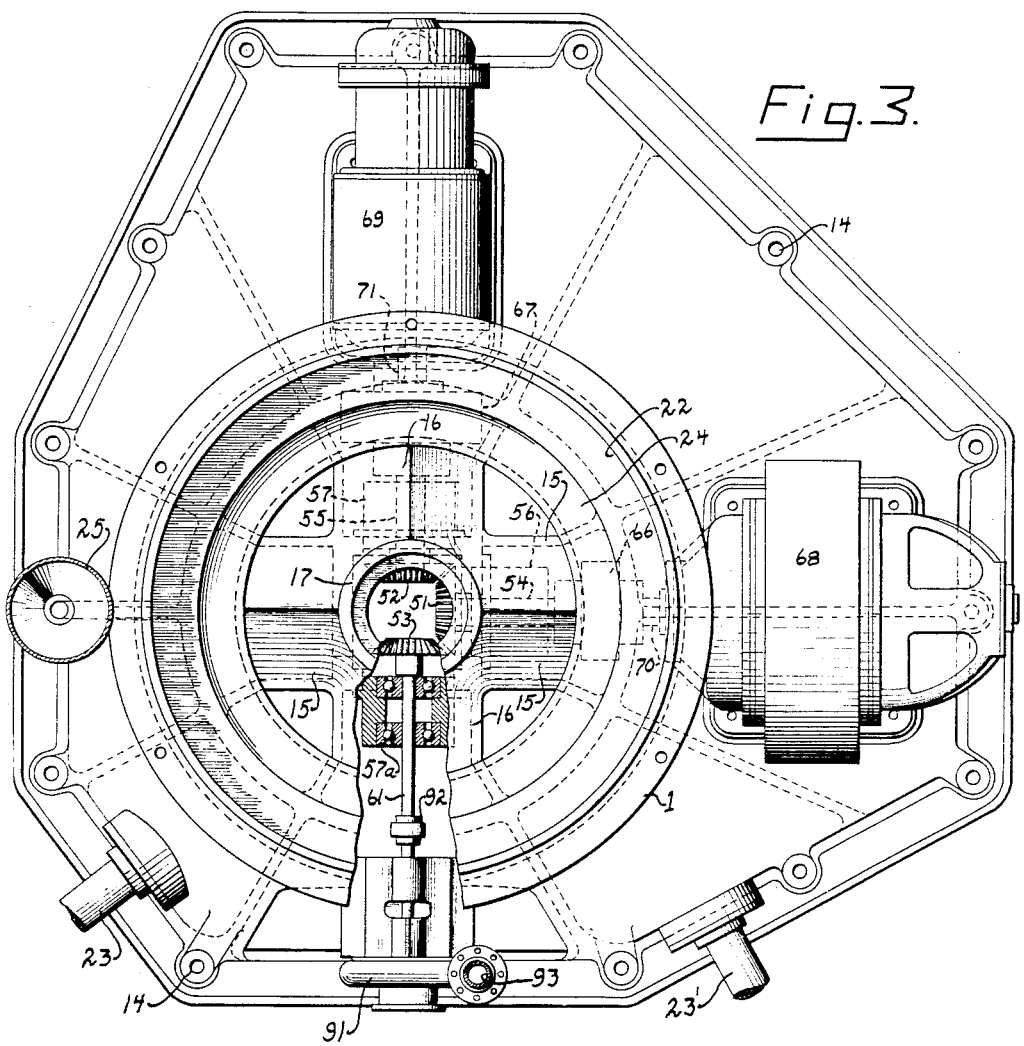
Fig. 3 is a plan view of the base of the frame of the machine partly in section to illustrate the compressed air pump.

The bottom section 1 is hollow, constituting an effluent receiving tank 8 and including a hollow base portion 8' which has communication with the tank through openings 8ª to receive solids in suspension settling or separating by gravity from the liquid in the tank 8. The tank and its hollow base portion are preferably cast integral, constituting a single unit, and the base portion 8' is illustrated in Fig. 3 of the drawings as being of irregular octagonal shape, but the form thereof may be varied.

The tank 8 includes inner and outer side walls 9 and 10 which rise from the hollow base portion, and the inner wall provides an interior space or passage 11 through which sludge discharged from the centrifugal basket 13 may pass at the lower open end 12 of the space or passage 11 for deposit in a pit over which the machine may be disposed and from which it may be shoveled or otherwise removed. Obviously, the sludge may be discharged into an incinerator or it may be discharged onto a conveyor or otherwise disposed of, as may be desired. The base portion 8' has openings 14 for the reception of bolts or other suitable fastening means for securing the base upon the walls of a pit or upon any other suitable foundation. The tank 8 and the hollow base portion 8' may be varied as to the relative size illustrated in the drawings to vary the capacity of either the tank or the hollow base portion. The upper portion of the bottom section 1 of the casing is circular and includes inner and outer walls 20 and 21 which form an annular trough 22 for the reception of the effluent for delivery into the tank 8, as clearly illustrated in Figs. 2, 8 and 10 of the drawings. The annular trough constitutes the mouth or entrance to the tank 8 and the water or liquid flowing into the annular trough or mouth of the tank collects in said tank, and it may flow off through outlet pipes 23 extending from the hollow base section of the casing, as clearly illustrated in Figs. 1, 3, 7 and 8 of the drawings. The sediment or solids in suspension and separated from the liquid in the tank 8 may pass from the hollow base portion 8' of the base section 1 through one or more outlets 23'.

At the central portion the bottom section is reinforced by diametrically disposed integral longitudinal and transverse bracing members 15 and 16 constituting a spider and located above and adapted to shield the gearing and mechanism for rotating the centrifugal basket and they prevent the sludge discharged from the machine from accumulating on the basket actuating means and interfering with or otherwise affecting the operation of the basket actuating mechanism. The members 15 and 16 have oppositely inclined side portions and present upper inclined surfaces which are adapted to shed sludge falling upon the said members 15 and 16. The spider is provided with a central integral bearing supporting ring 17 of cylindrical form provided at its lower end with an inwardly extending annular flange 18 which provides a supporting ledge for bearings hereinafter described.

The bottom portion 19 of the base is hollow to provide the desired capacity of effluent receiving tank 8 and the capacity of the tank may be varied by varying the extent of the hollow portions of the said base. The central opening 12 defined by the inner walls 9 of the base permits the free discharge of sludge through the base of the machine. The upper portion of the bottom section 1 of the casing is circular including inner and outer walls 20 and 21 which form an annular trough 22 for the reception of the effluent for delivery into the tank 8, as clearly illustrated in Fig. 2 of the drawings. The annular trough constitutes the mouth or entrance to the tank 8 and the water or other liquid flowing into the annular trough or mouth of the tank collects in said tank and after being treated with chemicals, when required or desired, flows off through outlet pipes 23 extending from the hollow base of the casing, as clearly illustrated in Figs. 1, 2 and 3 of the drawings.

The inner wall 20 of the annular trough or mouth of the tank 8 is provided at the top with an inclined flange 24 extending outwardly and overhanging the inner portion of the trough 22 and adapted to prevent water or other liquid entering the trough 22 from splashing over the inner wall and into the pit or other sludge receiving means.

Located at one side of the casing is a vertically disposed chemical receiving hopper or receptacle 25 provided with a tapered bottom portion 26 which is connected by an elbow 27 with the annular trough or mouth of the effluent receiving tank. The elbow preferably consists of a short L-shaped pipe connection having vertical and horizontal arms, the vertical arm being connected to the bottom portion of the receptacle 25 and the horizontal arm having an inner threaded end 28 which is screwed into a threaded opening 29 in the outer wall 21, as clearly illustrated in Fig. 2 of the drawings. The chemical receptacle 25 which may be provided with a suitable cover 30 is adapted to receive chemicals for the treatment of the effluent and the flow of the contents of the receptacle into the casing may be controlled by any suitable means and any suitable chemicals or other material may be employed for the treatment of the effluent so that the effluent when discharged from the machine will be in a form or condition unobjectionable and meeting any requirement which may be made for the disposal of effluent.

The provision of a chemical tank and means for supplying chemicals for the treatment of the effluent in connection with the structure illustrated results in a compact and complete unit for performing all of the functions of a chemical or other plant in effecting the desired separation of the water from the solid material of the sludge and in the treatment of the effluent so that the effluent may be discharged in a clear and proper condition and the sludge discharged in a condition in which it may be shoveled or otherwise conveniently handled and also in a condition in which it may be readily incinerated.

The lower intermediate section 3 of the casing is cylindrical and the upper intermediate section which is circular constitutes a spacing and supporting member and is preferably hollow as shown. The top section 4 which is tapered upwardly constitutes a cap and houses the mechanism supported upon the intermediate section 2 and is preferably constructed of lighter material than the other sections of the casing.

The centrifugal basket 13 consists of a cylindrical body portion, a circular bottom plate 31 and a circular top plate 32, the top plate and bottom plate being bolted to the body portion of the centrifugal basket, as explained in the aforesaid application, the bolts being omitted in the present illustration for convenience. The cylindrical body portion of the basket 13 forms imperforate vertical walls or sides and the bottom plate of the basket has a horizontal upper face and is provided with a central hub 33 and has a plurality of radial openings 34 surrounding the hub for the discharge of sludge from the basket.

The top plate 30 of the centrifugal basket is of annular form and provides a central opening 35 and it is provided in its lower face with an annular series of radial channels 36 which are covered by a screen or seepage plate 37 interposed between the top plate 32 and the body portion of the basket 13 and securely clamped between the same by the fastening means for securing the top plate 32 to the body portion of the basket. The screen or seepage plate 37 is provided at the channels 36 with openings 38 arranged at an inclination and extending upwardly and outwardly, as clearly illustrated in Fig. 9 of the drawings. The screen or seepage plate 37 is also provided at its outer portion beyond the groups of inclined openings 38 with vertical openings 39 which register with downwardly and outwardly inclined flared openings 40 formed in the body portion of the basket 13.

The water or other liquid removed from the material through the centrifugal action of the rotary basket flows upwardly and outwardly through the inclined openings 38 into the channels 36 and then radially outwardly to the outlet passages formed by the openings 39 and 40 which discharge the water radially and downwardly into an annular space 41 between the rotary basket and the casing of the machine. The water or other liquid flowing downwardly through the said space 41 enters the circular trough or mouth 22 of the tank 8 and flows into the same where the light solids held in suspension in the separated liquid settle to the bottom of the tank and the liquid is discharged through the outlet pipes 23. As the effluent or liquid separated from the solids passes through said space 41, it is subjected to violent turbulence and aeration incident to centrifugal action due to rotation of the basket. At the zone of turbulence and aeration and while the liquid is in a state of turbulence, chemical material is introduced into the liquid, effecting a thorough mixing of the liquid, air and chemical material at the zone of turbulence and aeration. The result is a rapid coagulation of the solids in suspension in the separated liquid and a rapid precipitation of the suspended solids in the tank 8 to expeditiously purify the liquid in tank 8.

In order to prevent the inclined openings 38 of the screen or seepage plate 37 from becoming clogged a screen 42 is arranged at the lower face of the seepage plate 37 and is provided at the groups of inclined openings with small perforations 43 preferably arranged in groups at each of the inclined openings 38. The screen 42 which may be secured in place in any suitable manner and which may be of any preferred construction effectually prevents fibre contained in the material from clogging the openings of the seepage plate. The openings in the screen may be varied in form and number as will be readily understood. The seepage plate 37 and the screen 42 are preferably of annular form but they may be of any other desired construction as will be readily understood. Also as the top plate 32 of the centrifugal basket, the seepage plate 37 and the screen 42 are readily removable, seepage plates having openings of different sizes may be provided to enable the openings in the seepage plate to be readily changed by substituting one seepage plate for another to adapt the seepage openings to the character of the material operated on by the machine.

The hub 33 of the bottom plate of the basket is mounted on a central vertical shaft 44 and is keyed or otherwise secured to a cylindrical portion 45 thereof. The lower portion of the vertical shaft 44 is journaled in lower bearings 46 mounted in the bearing supporting ring 17 and designed to be constructed similar to the bearings shown and described in the said application. Any suitable lower bearings may, of course, be employed for mounting the lower portion of the vertical shaft 44.

The bearings are fully enclosed as shown, and are fully protected from the material operated on by the machine so that there is no liability of any of the sludge coming in contact with the lower bearings. The lower end of the vertical shaft 44 has keyed or otherwise secured to it a horizontal bevel gear 47 and the upper terminal portion of the said vertical shaft 44 is mounted in upper bearings 48 designed to be constructed similar to the bearings of the said application and mounted in a central opening 49 in the upper intermediate supporting section or member 2 of the casing of the machine.

The horizontal bevel gear 47 which is detachably secured on the lower end of the vertical shaft 44 by a nut 50 meshes with vertical bevel gears 51, 52 and 53. The vertical bevel gears 51 and 52 are keyed or otherwise fixed to horizontal motor actuated shafts 54 and 55 mounted in suitable bearings 56 and 57 supported in a gear case 58. The gear case 58 is formed integral with and depends from the bearing supporting ring 17 and it constitutes a shaft hanger for supporting the said shafts 54 and 55. The gear case is provided at four sides at diametrically opposite points with four circular openings 59, three of which receive bearings and the other opening in the present form of the centrifugal separating machine is closed by a suitable cover plate 60. The shafts 54 and 55 are arranged at right angles to each other and the bearings 56 and 57 of the said shafts are located in two of the openings 59 and the other opening 59 receives bearings 57a for a horizontal shaft 61 to which the vertical bevel gear 53 is keyed or otherwise secured.

The housings of the bearings 56, 57 and 57a are suitably secured to the gear case and close three of the side openings thereof, the other side opening 59 being closed by the said cover plate 60.

The gear case is also provided at the bottom with an opening 62 which is normally closed by a bottom plate 63 suitably secured to the gear case and supporting an oil pump 64 constituting a portion of the lubricating means disclosed in the said application. The pump is of the rotary type and is provided at the top with a horizontal bevel gear 65 which meshes with the vertical bevel gear 51 at the bottom thereof. As the lubricating means is designed to be constructed the same as that disclosed in the said application and as it does not constitute a portion of the present invention, further description and illustration thereof are deemed unnecessary.

The shafts 54 and 55 which are connected by suitable clutches 66 and 67 are arranged at right angles to each other and are connected by the said clutches with a high speed motor 68 and a low speed motor 69 mounted upon the base and arranged at right angles to each other, as clearly illustrated in Fig. 3 of the drawings. The clutches 66 and 67 which connect the motor actuated shafts 54 and 55 to the shafts 70 and 71 of the high speed motor and the low speed motor are designed to be constructed similar to the clutches of the said application and as clutches of any desired construction may be employed, detail description and illustration thereof are deemed unnecessary in the present application.

The high speed motor rotates the centrifugal basket at high speed for purging and the low speed motor rotates the said basket at a slow speed for unloading and as the cycle of operation of the machine is designed to be substantially the same as that described in the said application, further description of the same is unnecessary in the present application.

Figure 2:
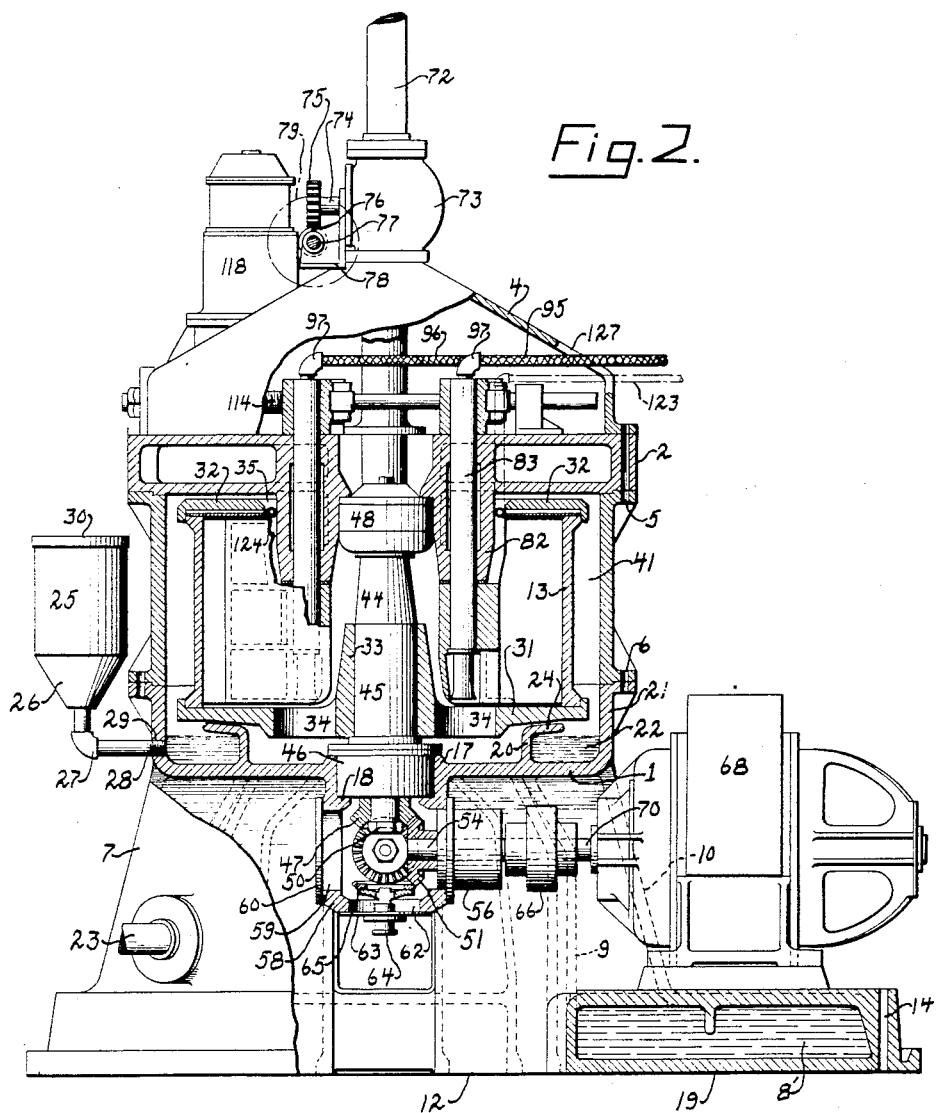
Fig. 2 is a vertical sectional view of the same partly in elevation.

The sewage or other material to be dewatered is fed to the centrifugal machine through a vertical feed pipe 72 and the flow of the material into the machine is controlled by a standard valve 73 supported upon the top or cap section of the casing and having a horizontal rotary valve stem or shaft 74 to which is keyed or otherwise secured a vertical worm wheel 75 which meshes with a worm 76 of a shaft 77 journaled in suitable bearings of a supporting bracket 78 and designed to be provided at one end with a hand wheel 79, as illustrated in dotted lines in Fig. 2 of the drawings for manually operating the valve. The valve in the continuous operation of the automatic centrifugal machine is designed to be periodically operated by a standard electrically controlled unit as explained in the aforesaid application for feeding sewage or other material during a portion of the cycle of the operation of the machine and for shutting off the flow of material during another portion of the cycle of the operation of the machine. When the shaft 77 is rotated manually or by the standard electrically controlled unit, its worm will rotate the worm wheel 75 and open or close the valve according to the direction of the rotation of the shaft 77.

The feed pipe 72 is of the same construction as that shown and described in the said application and it is provided with branch feed portions 80 extending downwardly into the centrifugal basket and discharging into the same at opposite sides thereof, one of the branch feed portions and its outlet 81 being shown in detail in Fig. 5 of the drawings.

The intermediate supporting member 2 of the casing of the machine is of substantially the same construction as that shown and described in said application and it is provided at opposite sides of the center with vertical hubs 82 depending from the supporting member and extending into the upper portion of the centrifugal basket and having mounted within them vertical shafts 83. The vertical shafts 83 which are hollow and which constitute compressed air conduits, extend through the hubs 82 and project above and below the same, as clearly illustrated in Fig. 2 of the drawings.

Mounted upon the lower portions of the hollow shafts are hollow curved scrapers 84 tapered outwardly from the shafts and provided at their inner ends with reduced portions 85 having openings 86 to receive the hollow shafts 83 and keyed or otherwise secured to the same. The scrapers which are arranged vertically are located at diametrically opposite points and they are adapted to fold inwardly as explained in the said application and are moved outwardly by scraper operating mechanism, hereinafter described to carry toothed cutting blades 87 into the path of the material 88 collecting on the inner face of the vertical walls of the rotary centrifugal basket 13, as explained in the said application.

The blades 87 cut the material into thin sheets or pieces which are directed or converged inwardly towards the center of the rotary basket by the curved face 89 of each scraper which is provided at the said curved face 89 with an inclined shoulder 90 having a curved transversely disposed approximately semi-circular face. The curved face of the shoulder and the adjacent curved face 89 of the body of the scraper form a substantially hook-shaped portion for engaging and curling or coiling the material to shape the same into compact form to facilitate the passage of the material through the bottom openings 34 of the basket. The inclined approximately hook shaped face of the scraper against which the material impinges pockets the material and the mechanical means forces the same downwardly through the bottom openings in the basket. In other words, the rotary centrifugal basket is provided with a bottom opening and one or more horizontally swinging scrapers arranged in the basket and operable therein and movable into the path of dewatered sludge for removing the dewatered sludge from the side walls of the basket, the scraper or scrapers being each provided with an inclined shoulder, in one embodiment of the invention, extending downwardly and inwardly from the top to the bottom of the scraper, the said shoulder being concaved throughout the length thereof transversely so as to curl the cut sludge and deflect it away from the scraper and in cooperation with the inclination of said shoulder force the cut sludge downwardly toward and out of the basket through the bottom opening of the latter.

Cooperating with the mechanical means for forcing material through the bottom openings of the basket is a compressed air discharging means comprising a rotary air compressor or pump 91 mounted on the base of the machine at a point diametrically opposite the low speed motor 69 and connected by a suitable clutch 92 with the horizontal shaft 61 whereby when the centrifugal basket is rotated at slow speed for unloading the basket of the solids the compressed air pump may be simultaneously operated. The pump is connected with a compressed air pipe 93 which extends from the pump to the upper portion of the casing exteriorly thereof and is connected with a flexible pipe 94 having branches 95 and 96 extending to the upper ends of the hollow vertical shafts and connected to and communicating with the bores or passages thereof by L-shaped fittings or couplings 97.

The ends of the branch pipes are preferably provided with threaded nipples 98 which are screwed into the couplings or fittings 97 whereby the branches of the flexible pipe or section of the compressed air pipe or line are detachably connected to the hollow vertical shafts of the pivotally mounted scrapers. The flexible pipe with its branches 96 and 97 permit the necessary rotative movement of the hollow vertical shafts and the pivotal movement of the scrapers. The hollow vertical shafts are provided at their lower ends with discharge nozzles 99 disposed vertically within a recess 100 in each of the scrapers at the lower ends thereof formed by enlarging or counterboring the lower ends of the openings 86. Each nozzle 99 has a threaded upper end 101 which is screwed into the lower end of the associated hollow vertical shaft. The nozzle 99 which is housed within the recess 100, as clearly illustrated in Fig. 6 of the drawings, is provided with a flaring lower end 102 forming a discharge mouth for directing the compressed air upon the cut material for blowing or forcing the same through the bottom openings 34 of the centrifugal basket. The rotation of the centrifugal basket carries the bottom openings 34 beneath the discharge nozzles and the compressed air blows the cut material through the said bottom openings 34 and cooperates with the mechanical means of the scrapers in forcing the cut material through the said bottom openings 34.

The hollow scrapers are preferably provided at their inner portions with passages 103 registering with openings 104 communicating with the vertical passages of the hollow vertical shafts to form branch passages leading from the vertical passages of the vertical shafts 83 to the interior of the scrapers which are provided at their outer edges in rear of the blades 87 with jet apertures 105, substantially as shown and described in the aforesaid application.

The hollow scrapers form interior chambers 106 and the jet openings 105 which are located back of the blades 87 are for the purpose of cleaning the cutters and at the same time clean the interior surface of the basket when the major portion of the sludge has been cut out of the latter, as explained in the said application. These air jets may or may not be employed as desired, and in practice, the air compressor or pump which is located upon the base of the machine and which constitutes a unit of the same, will have sufficient power to deliver the required volume of compressed air under the desired pressure.

The scraper operating mechanism for moving the scrapers inwardly and outwardly is designed to be substantially the same as that shown and described in the said application, the upper ends of the hollow shafts being provided with operating arms 107 extending horizontally from the shafts 83 and provided at their outer portions with pins or pivots 108 which are connected with blocks 109 slidably mounted in transverse openings 110 of a longitudinally slidable connecting bar 111. The slidable connecting bar which is arranged transversely of and is located above the supporting member 2 of the casing of the machine is spaced from the center thereof, as clearly illustrated in Fig. 4 of the drawings. One end portion 112 is arranged in a suitable guide 113 and its other end is connected with a screw 114 engaged by an interiorly threaded horizontally disposed sleeve 115.

Figure 4:
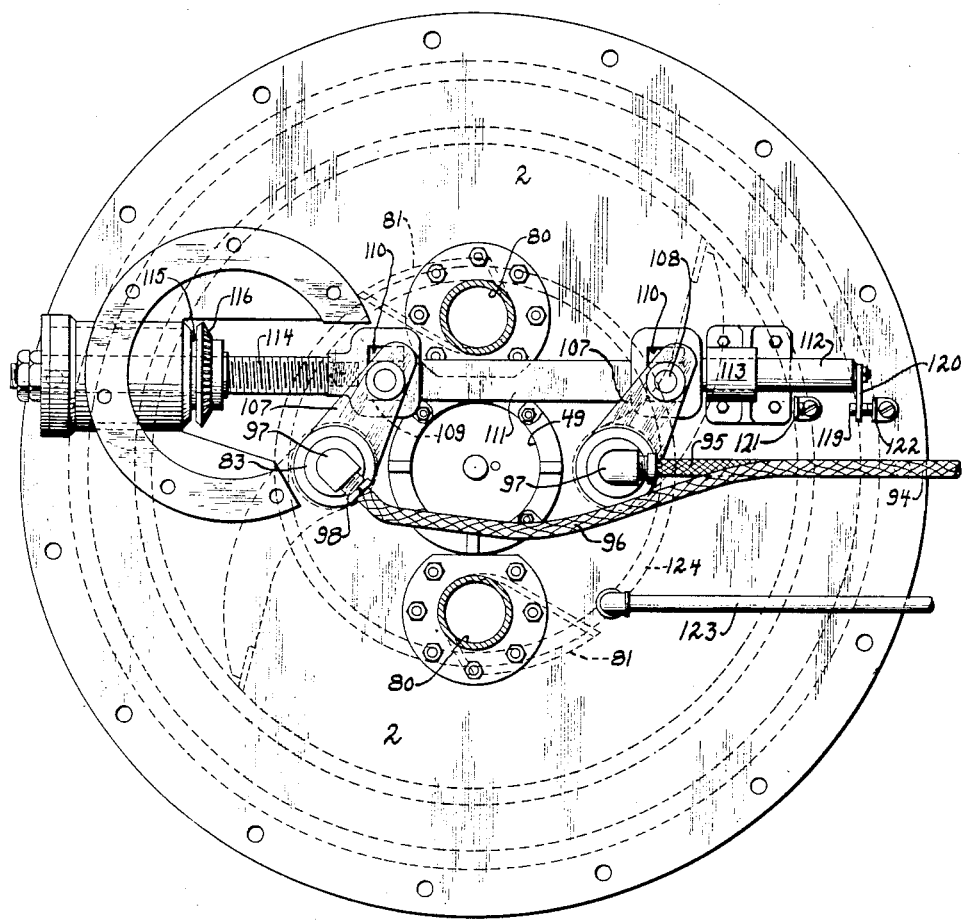
Fig. 4 is a plan view partly in section showing the scraper operating mechanism and the air connections to the cleaner ring and the hollow shafts of the scrapers.

The sleeve is mounted in a suitable bearing and is provided at its inner end with a vertically disposed bevel gear 116 fixed to the interiorly threaded sleeve 115 and meshing with a horizontal bevel gear 117 of a vertically disposed electric motor 118 adapted to be operated for swinging the scrapers outwardly and inwardly. As the scraper operating mechanism and the manner of mounting the same are designed to be constructed and operated the same as shown and described in the said application and as such mechanism does not constitute a portion of the present invention, and, furthermore, as any suitable operating mechanism may be employed for moving the scrapers inwardly and outwardly, further description of such operating mechanism is deemed unnecessary. In Fig. 4 of the drawings the portion 112 of the connecting bar is provided at the outer end with an electrical contact element 119 preferably mounted on an arm 120 and carried between inner and outer electrical contacts 121 and 122 in the sliding movements of the connecting bar 111 for closing suitable circuits of a control mechanism, not shown, and not forming a portion of the present invention. The compressed air line or pipe 93 is also connected by a branch pipe 123 with a hollow cylindrical ring 124 arranged within the open top of the centrifugal basket in close proximity with the inner periphery of the top plate of the basket and provided in its outer side or periphery with an annular series of jet apertures 125 for the discharge of compressed air into the spaces or channels between the seepage plate 37 and the top plate 32 of the rotary basket.

The jet apertures which are located at the radial channels 36 are adapted to discharge compressed air or other fluid medium under pressure into the channels to clean the same by blowing or forcing foreign particles outwardly through the channels and downwardly and outwardly through the inclined passages formed by the openings 39 and 40 at the rim of the basket. The compressed air or other fluid discharged into the channels also is adapted to clean the inclined openings 38 and the apertures of the screen by removing such fibers as may be caught in the perforations or openings of the seepage plate and the screen by blowing the fibres back into the basket. The branch pipe 123 extends into the top section 4 of the casing of the machine and has a downwardly extending arm 126 at its inner end which is connected at the lower end by a suitable coupling means with the ring or compressed air discharging member 124. The top section of the casing is provided with a suitable opening 127 for the passage of the branches of the compressed air line.

It will be seen that the machine is of great practical value in the process of treatment of sludge in sewage disposal plants as it will reduce water in sewage to a clear effluent that may be returned to streams and rivers with safety and effect a separation of the solids in a condition suitable for incineration or other useful commercial disposal of the same.

While the chief practical purpose of the machine is for the dewatering of industrial sludge, paper pulp and sewage sludge, the machine may be used for various industries, such as chemical, textile, brewery, mining and the like. Also instead of employing compressed air for cleaning the seepage means, steam or water may, of course, be employed for this purpose, and any suitable means may be connected with the pipe line leading to the cleaning ring for supplying water, steam or other fluid under pressure for this purpose.

It will be apparent that the machine of the present invention combines in a single machine a plant or apparatus for treating sewage and that it is adapted to effectively and rapidly dewater the same to the extent of enabling the sludge to be practically and commercially handled and that the effluent may be treated chemically or biologically so that when discharged from the machine it will be as clear and unobjectionable as desired.

It will also be clear that simple, practical and effective means are provided for cutting the sludge from the basket and for positively discharging the cut material from the basket and that means are provided for cleaning both the cutting means and the walls of the basket and also the openings and passages of the seepage means.

Furthermore, it will be seen that while the compressed air pump may be operated by any suitable means, in the form of the invention illustrated in the drawings, it is compactly arranged and constitutes a unit of the machine and is operated by the means for rotating the centrifugal basket.

In a compact closed system, that is, in single apparatus or equipment in which all parts are closely coupled together, I am enabled to carry out efficiently and in a comparatively short period of time the process or method of treating sludges by effective separation of the liquids from the solids, discharging the liquid and gradually building up a wall or cake of solids from which liquids and moisture have been removed, rendering the formed cake comparatively dry or to the extent that the cake may be readily reduced to small particles capable of being utilized at once for various purposes. Prior to reduction of the formed cake into particles, the separated and discharged liquid in movement to a receiving tank therefor is subjected during such movement to violent turbulence and aeration, and at the zone of turbulence and aeration I provide means for introducing a chemical agent into the liquid for mixture with the liquid and air to facilitate rapid coagulation of the smaller solids in suspension in the liquid and a quiescent precipitation or settling of same by gravity in the tank 8 and a consequent rapid purification of the liquid in the tank 8 from which the purified liquid may pass from the tank in such a purified condition as to meet legislative or other requirements for discharge into rivers, streams, lakes or other places. As the formed cake of solids is reduced, the particles thereof are discharged from the apparatus or plant into a pit from which they may be readily shoveled or otherwise removed, as, for instance, on conveyors or the like for fertilizing, incinerating or other purposes. The separation of solids in suspension from the separated liquid is at a zone separate from the zone of the first separation of liquid from solids, and the centrifugal action at either zone does not interfere with the centrifugal action at the other zone of separation and, while the formed cake is reduced to small particles at the place where it is formed, the reduction thereof and discharge of same is accomplished without danger of the reduced solids finding way into either of said separating zones.

What is claimed is:—

1. A centrifugal separating machine including a casing provided with an effluent receiving tank, a rotary centrifugal basket arranged within said casing and spaced therefrom to provide a passage therebetween leading to said tank, the basket being constructed to discharge effluent from the top thereof into said passage, the basket having an opening in its bottom, the rotation of the basket seting up turbulence between the basket and the casing effecting aeration of the effluent as it passes through said passage from the basket to the tank, means for introducing a chemical agent into the interior of the casing at the zone of turbulence and aeration for admixture with the liquid to effect a thorough mixing of the effluent, air and chemical agent and effect rapid coagulation of the solids in suspension in said tank and a quiescent settling of the suspended solids by gravity, and means for reducing the cake into small particles in said basket for discharge through the opening in the bottom of the latter.

2. A centrifugal separating machine comprising a casing including an effluent receiving tank at the lower portion thereof provided at its top with a trough having openings communicating with the interior of the tank, a rotary centrifugal basket mounted in the upper portion of the casing above said tank and provided at the top with seepage means and having imperforate side walls and being of smaller cross sectional diameter than the cross sectional diameter of the casing to provide an intervening space for the passage of effluent from the top of the basket downwardly between the basket and the upper portion of the casing and incident to rotative movement of the basket create currents of air between the basket and the upper portion of the casing to subject the effluent to violent turbulence in said intervening space to effect a thorough admixture of effluent and air prior to precipitation of the effluent sediment in the receiving tank, and means for maintaining the liquid within the tank normally at a predetermined level and in relatively close proximity to the lower portion of the basket.

3. A centrifugal separating machine comprising a casing including an effluent receiving tank at the lower portion thereof provided at its upper portion with a trough having an opening in the bottom thereof leading into said tank, a rotary centrifugal basket mounted in the upper portion of the casing above said tank and open at the top and having imperforate side walls and being of smaller cross sectional diameter than the cross sectional diameter of the casing to provide an intervening space for the passage of effluent from the top of the basket downwardly between the basket and the upper portion of the casing and incident to rotative movement of the basket create currents of air between the basket and the upper portion of the casing to subject the effluent to violent turbulence in said intervening space to effect a thorough admixture of effluent and air prior to precipitation of the effluent sediment in the receiving tank, means for maintaining the liquid within the tank normally at a predetermined level and in relatively close proximity to the lower portion of the basket, and means located exteriorly of the casing and communicating with said trough for the supply of a chemical at will to the effluent for the purification of the same.

4. A centrifugal separating machine including a rotary centrifugal basket and an effluent treating tank having an open portion located adjacent to and arranged to receive effluent from the centrifugal basket, means for maintaining liquid within the open portion of the tank at a predetermined level and in close proximity to the basket to expose the effluent to the action of currents of air created by the rotary movement of the centrifugal basket to produce an oxidizing effect on the effluent, and means for feeding chemicals to the tank for the purification of the effluent.

5. A centrifugal separating machine including a rotary centrifugal basket having an opening in the bottom thereof, a casing receiving the centrifugal basket and having a hollow base forming an effluent receiving tank open at the top adjacent the centrifugal basket, said base having an interior space for the discharge of dewatered solids through the base and provided in its side walls with openings leading from said interior space, high and low speed motors arranged in a horizontal plane at right angles to each other and supported upon said base of the casing adjacent the openings thereof, and means for connecting the motors with the basket for rotating the same at a high purging speed and a low cleaning speed.

6. A centrifugal separating machine including a substantially cylindrical rotatable centrifugal basket, a casing receiving the basket and provided with an effluent receiving tank and having an annular trough located beneath and adjacent the basket and receiving effluent therefrom and communicating through its bottom with the tank for conducting the effluent into the same, and means for maintaining liquid within the trough at a predetermined level and in relatively close proximity to the basket.

7. A centrifugal separating machine including a rotary centrifugal basket having a bottom opening, and a horizontally swinging scraper operating within the basket and movable into the path of dewatered sludge for removing the sludge from the basket and on one side face thereof being provided with a straight inclined shoulder extending downwardly and inwardly from the top to the bottom of the scraper, said shoulder being concaved throughout its length transversely so as to curl the cut sludge and deflect the cut sludge away from the scraper and in cooperation with the inclination of said shoulder force the cut sludge downwardly toward and out of the basket through the bottom opening of the latter.

8. A centrifugal separating machine including a rotary centrifugal basket having a bottom opening, and a horizontally swinging scraper operating within the basket and movable into the path of dewatered sludge for cutting the same from the basket and provided with a fluid medium conduit having an outlet arranged to discharge compressed fluid medium downwardly upon the cut sludge to force the same through the bottom of the basket simultaneously with the sludge cutting operation.

9. A centrifugal separating machine including a rotary centrifugal basket having a bottom opening, and a horizontally swinging scraper operating within the basket and movable into the path of dewatered sludge for cutting the same from the basket and provided with a compressed air conduit having a nozzle located at the bottom of the scraper and arranged to discharge compressed air upon the cut sludge to force the same through the bottom of the basket.

10. A centrifugal separating machine including a rotary centrifugal basket having a bottom opening, and a horizontally swinging scraper operating within the basket and movable into the path of the dewatered sludge for cutting the same from the basket, and a hollow vertical shaft upon which the scraper is mounted, said hollow shaft forming a compressed air conduit and arranged to discharge compressed air downwardly upon the cut sludge for forcing the same through the bottom of the basket simultaneously with the sludge cutting operation.

11. A centrifugal separating machine including a rotary centrifugal basket having a bottom opening, a horizontally swinging scraper operating within the basket and movable into the path of the dewatered sludge for cutting the same from the basket, and a hollow vertical shaft upon which the scraper is mounted, said hollow shaft forming a compressed air conduit and provided at its lower end with a nozzle housed within the scraper and arranged to discharge compressed air upon the cut sludge to force the same through the bottom of the basket.

12. A centrifugal separating machine including a rotary centrifugal basket having a bottom opening, a hollow vertical shaft extending into the basket and forming a compressed air conduit and provided at its lower end with a nozzle, and a horizontally swinging scraper movable into the path of the dewatered sludge for cutting the same from the basket, said scraper being provided at its inner portion with a vertical opening receiving the shaft and enlarged at the lower end to form a recess in which the nozzle is housed, said nozzle being arranged to discharge compressed air upon the cut sludge to force the same downwardly through the bottom of the basket.

13. A centrifugal separating machine including a rotary centrifugal basket having a bottom opening, a horizontally swinging scraper operating within the basket and movable into the path of dewatered sludge for cutting the same from the basket and provided with an inclined shoulder arranged to engage the cut sludge and force the same downwardly, and means for discharging compressed air upon the cut sludge and cooperating with the said shoulder for forcing the cut sludge through the bottom of the basket.

14. A centrifugal separating machine including a rotary centrifugal basket having a bottom opening, a horizontally swinging scraper operating within the basket and movable into the path of dewatered sludge for cutting the same from the basket and provided with an inclined shoulder concaved transversely of the shoulder and arranged to engage the cut sludge and force the same downwardly, and a hollow vertical shaft upon which the swinging scraper is mounted constituting a compressed air conduit and provided at its lower end with a nozzle arranged to discharge compressed air upon the cut sludge to cooperate with the inclined shoulder for forcing the sludge through the bottom of the basket.

15. A centrifugal separating machine including a rotary centrifugal basket having a bottom opening, spaced vertical shafts extending into the basket and constituting compressed air conduits having discharge nozzles at their lower ends, horizontally swinging scrapers mounted on the shafts and operating within the basket and movable into the path of the dewatered sludge for cutting the same from the basket, a compressed air pump constituting a unit of the separating machine, means for connecting the pump with the hollow shafts for supplying compressed air to the same and for discharging compressed air on the cut sludge for forcing the same through the bottom of the basket simultaneously with the sludge cutting operation, and means for operating the rotary basket and the pump.

16. A centrifugal separating machine including a rotary centrifugal basket having a bottom opening, spaced hollow vertical shafts extending into the basket and constituting compressed air conduits and having nozzles at their lower ends, horizontally swinging scrapers mounted on the vertical shafts and movable into the path of dewatered sludge for cutting the same from the basket, a compressed air pump forming a unit of the machine, and an air feed pipe extending from the pump and provided with flexible branches connected to the upper ends of the hollow shafts for feeding compressed air to the same.

17. A centrifugal separating machine including a casing provided with a base, a vertical shaft journaled within the casing, a rotary centrifugal basket mounted on the vertical shaft and operating within the casing, high and low speed motors mounted on the base and disposed at right angles to each other, a compressed air pump also mounted on the base of the casing and located opposite one of the motors, gearing located within the base of the casing and connecting the motors with the vertical shaft and the compressed air pump for simultaneously actuating the same, spaced vertically disposed hollow shafts journaled within the casing and extending into the rotary basket and provided at their lower ends with discharge nozzles, horizontally swinging scrapers mounted on the vertical shafts and operating within the basket and movable into the path of dewatered sludge for cutting the same from the basket, and a compressed air feeding pipe extending from the pump and having branches connected with the upper ends of the hollow shafts for supplying compressed air to the same for discharging compressed air upon the cut sludge simultaneously with the sludge cutting operation.

18. A centrifugal separating machine for dewatering sludges including a rotary centrifugal basket having imperforate side walls and provided at the top with means for permitting seepage of liquids from the basket, and means for injecting a fluid medium into the liquid seepage means for cleaning the same.

19. A centrifugal separating machine for dewatering sludges including a rotary centrifugal basket having imperforate side walls and provided with means operating at right angles to the centrifugal force for permitting seepage of liquids from the basket, and means for injecting a fluid medium into the liquid seepage means for cleaning the same.

20. A centrifugal separating machine including a rotary centrifugal basket having imperforate side walls and provided at the top with means for permitting seepage of liquid from the basket including radial passages, and means for discharging a fluid medium through the passages for cleaning the same.

21. A centrifugal separating machine including a rotary centrifugal basket having imperforate side walls and provided at the top with means for permitting seepage of liquid from the basket including radial passages, and means located within the basket for discharging a fluid medium outwardly through the passages for cleaning the same.

22. A centrifugal separating machine including a rotary centrifugal basket having imperforate side walls and provided at the top with means for permitting seepage of liquid from the basket including radial passages, and a cleaning ring arranged within the upper portion of the basket and provided with jet apertures arranged to discharge a fluid medium through the passages for cleaning the same.

23. A centrifugal separating machine including a rotary centrifugal basket provided with an imperforate body portion and having an annular top plate provided with radial passages extending from the interior of the basket to the exterior of the basket for seepage of liquid from the basket, and a fixed annular cleaning ring located within the upper portion of the basket in close proximity to the radial passages and having jet apertures arranged to discharge a fluid medium into the passages from the inner ends thereof for cleaning the passages.

24. In a centrifugal separating machine, a rotary centrifugal basket including a cylindrical body portion forming imperforate side walls, a top plate secured to the cylindrical body portion, a seepage plate arranged at the lower face of the top plate and provided with apertures for the admission of liquid separated from solids by centrifugal action, there being radial passages between the seepage plate and the top plate with which the said apertures communicate, and a cleaner ring arranged within the upper portion of the basket in close proximity to the inner periphery of the top plate and provided with jet apertures for discharging a fluid medium outwardly through the radial passages for cleaning the same and also for blowing back into the basket fibre and other particles accumulating at the said apertures of the seepage plate.

25. A centrifugal separating machine including a casing having a base, a centrifugal basket arranged within the casing and rotatable on a vertical axis and having imperforate side walls and provided at the top with passages for the seepage of liquid separated from sludge by the centrifugal action of the basket, a cleaning device located within the upper portion of the basket in close proximity to the inner ends of the said passages and provided with jet apertures for discharging compressed air through the same for cleaning said passages, hollow vertical shafts journaled in the casing and constituting air conduits, horizontally swinging scrapers mounted on the vertical shafts and movable into the path of dewatered sludge for cutting the same from the basket, a compressed air pump mounted on the base of the machine, and means for connecting the pump with the hollow shafts and with the cleaning device for supplying compressed air to the same.

26. A centrifugal separating machine including a rotary centrifugal basket, a hollow vertical shaft extending into the basket and having a discharge nozzle at the lower end thereof, a horizontally swinging scraper mounted on the hollow shaft and operating within the basket and movable into the path of dewatered sludge for cutting the same from the basket, a pump constituting a unit of the separating machine, a pipe extending from the pump and connected with the hollow shaft, and means for rotating the centrifugal basket and for operating the pump simultaneously, whereby compressed air may be discharged downwardly upon the sludge simultaneously with the sludge cutting operation.

27. A centrifugal separating machine including a rotary centrifugal basket having a bottom opening, and a scraper operating within the basket and movable into the path of the dewatered sludge for cutting the same from the basket and provided with a fluid medium conduit having a nozzle located at the bottom of the scraper and shielded by the latter and arranged to discharge fluid medium upon the cut sludge to force the same through the bottom of the basket.

28. A centrifugal separating machine including a rotary centrifugal basket having a bottom opening, and a scraper operating within the basket and movable into the path of the dewatered sludge for cutting the same from the basket and having a compressed air chamber provided with spaced outlets located at the outer portion of the scraper for the discharge of compressed air, said scraper being also provided with a compressed air conduit communicating with the compressed air chamber and having a nozzle located at the bottom of the scraper and arranged to discharge compressed air upon cut sludge to force the same through the bottom of the basket.

29. A centrifugal separating machine including a rotary centrifugal basket having a bottom opening, a hollow vertical shaft extending into the basket and forming a fluid medium conduit and provided at its lower end with a discharge nozzle, a horizontally swinging scraper having a chamber and carried by the hollow vertical shaft and movable into the path of dewatered sludge for cutting the same from the basket and having a passage leading to said conduit of the vertical shaft, said chamber being also provided at its outer portion with fluid medium outlet means for discharging fluid medium under pressure into the basket to clean the scraping edge of the scraper and also to clean the interior surface of the side walls of the basket when the major portion of the sludge has been removed from the basket, the nozzle at the lower end of the hollow vertical shaft being arranged to discharge fluid medium upon cut sludge to force the same through the bottom of the basket.

30. A centrifugal separating machine including a rotary centrifugal basket having a bottom opening, a hollow vertical shaft extending into the basket and forming a compressed air conduit and provided at its lower end with a discharge nozzle, a hollow horizontally swinging scraper operating within the basket and carried by the vertical shaft and forming an interior compressed air chamber, said scraper being provided at its inner portion with a passage leading to the compressed air conduit of the vertical shaft and the outer portion of the scraper being provided with spaced jet openings communicating with the compressed air chamber for the discharge of compressed air, the nozzle at the lower end of the hollow vertical shaft being arranged to discharge compressed air upon cut sludge to force the same through the bottom of the basket.

31. A scraper for centrifugal separating machines including a body provided at its inner end with a shaft receiving opening and at its outer end having a cutting portion and on one side face between its inner and outer ends having a straight inclined shoulder extending downwardly and inwardly from the top edge to the bottom edge of the scraper, said shoulder having a concaved face disposed transversely thereof and facing toward the outer cutting portion of the blade.

32. In a centrifugal separating machine, a rotary centrifugal basket provided in its bottom with a sludge discharge opening and a horizontally swinging scraper operating within the basket and movable in an arc toward and from the side wall of the basket and provided with an inclined shoulder for forcing the sludge downwardly, said shoulder having its lower end terminating above the bottom opening of the basket and lying substantially over the said bottom opening throughout the full arc described by the scraper, and a hollow shaft upon which the scraper is mounted forming a passage for a fluid medium and having an outlet at the bottom of the scraper within the area of the latter whereby the fluid medium cooperates with the shoulder in forcing the cut sludge through the bottom opening of the basket to unload the latter.

33. The method of treating sewage and other materials, consisting in centrifuging the material sufficiently to separate the solids from the liquid in a compacted cake, collecting the liquid in a tank, subjecting the separated liquid prior to collecting the same in the tank to violent turbulence and aeration, and treating the collected liquid chemically to purify the same.

34. The method of treating sewage and other materials, consisting in centrifuging the material sufficiently to separate the liquid from the solids and form a compacted cake of the latter, subjecting the separated liquid to violent turbulence and aeration, subsequently collecting the aerated liquid in a tank and treating it chemically and permitting a thorough mixture of air, effluent and chemicals to purify the effluent.

35. The method of dewatering sludges consisting in centrifuging the material to separate the liquid from the solids and form a cake of the latter and simultaneously subjecting the separated liquid to turbulence and aeration incident to the centrifuging action and at the zone of turbulence and aeration and while the liquid is in a state of turbulence introducing a chemical agent into the liquid to effect a thorough mixing of the liquid, air and chemical agent, and collecting the separated liquid.

36. A centrifugal separating machine including a rotary centrifugal basket having a discharge opening in the bottom thereof, means for rotating the basket to separate the liquid from the solids and build up a wall of solids against the side walls of the basket, means operable in the basket to gradually reduce the built-up wall of solids into particles for discharge through said discharge opening, and means to supply a fluid medium under pressure, said means having an outlet directed towards said discharge opening to assist the reducing means to discharge the particles of solids through the discharge opening of the basket, and also having an outlet directed towards the side wall of the basket and the operative portion of said reducing means when said reducing means is in operative reducing position after removal of the solids wall from the basket, to simultaneously clean the operative portion of said reducing means and the side walls of the basket.

37. In a centrifugal separating machine, a rotary centrifugal basket mounted to rotate on a vertical axis and having imperforate side walls, means for rotating the basket to separate liquids from solids and build up a wall of solids against the side walls of the basket, a seepage means including channels open at their outer ends, the seepage means having communication with the channels and the interior of the basket, the basket having an opening in the bottom thereof for the discharge of solids from the basket, and means operable to free the seepage means of solid matter.

38. In a centrifugal separating machine, a rotary centrifugal basket mounted to rotate on a vertical axis and having imperforate side walls, means for rotating the basket to separate liquids from solids and build up a wall of solids against the side walls of the basket, a seepage means mounted on the basket at the top thereof and rotatable therewith and including channels open at their outer ends, the seepage means communicating with the interior of the basket and with said channels, the basket having an opening in the bottom thereof for the discharge of solids from the basket, means for gradually removing the wall of solids from the side walls of the basket for discharge through the opening in the bottom of the basket, and fluid pressure means operable to remove solid matter from the seepage means in the event of clogging of same incident to solid material.

39. In a centrifugal separating machine, a rotary centrifugal basket having imperforate side walls and mounted to rotate on a vertical axis to separate liquids from solids, means for rotating the basket, a seepage means having communication with the interior of the basket and the said seepage means being rotatable with the basket and including radially open-ended channels, and means for directing a flow of fluid under pressure through said channels from the inner ends to and through the outer ends of the same.

40. In a centrifugal separating machine, a rotary centrifugal basket mounted for rotation to separate liquids from solids and having imperforate side walls, means for rotating the basket, a seepage means having communication with the interior of the basket and carried by the latter and rotatable therewith to discharge the separated liquids from the basket, and means for directing fluid under pressure through the seepage means.

JOSEPH S. PECKER.